(12) United States Patent  
Strohmaier et al.

(10) Patent No.: US 8,743,295 B2  
(45) Date of Patent: Jun. 3, 2014

(54) REMOTE CONTROL DOCK SYSTEM AND METHOD

(71) Applicant: Honda Motor Co., Ltd., Tokyo (JP)

(72) Inventors: Jason Michael Strohmaier, Dublin, OH (US); Eric Joshua Wecker, Dublin, OH (US); Aaron Michael Ambrose, Dublin, OH (US); Steven Feit, Dublin, OH (US); Jason Alexander Dutter, Marysville, OH (US); Takahiro Ikunami, Kobe (JP); Hideyuki Hirota, Kobe (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 13/924,281

(22) Filed: Jun. 21, 2013

(65) Prior Publication Data

US 2013/0278843 A1    Oct. 24, 2013

Related U.S. Application Data

(62) Division of application No. 13/448,210, filed on Apr. 16, 2012, now Pat. No. 8,471,965, which is a division of application No. 12/346,831, filed on Dec. 30, 2008, now Pat. No. 8,159,623.

(60) Provisional application No. 61/017,827, filed on Dec. 31, 2007.

(51) Int. Cl.
    *H04N 5/64* (2006.01)

(52) U.S. Cl.
    USPC .......................................................... 348/836

(58) Field of Classification Search
    USPC .......... 348/836, 837, 838, 839, 840, 841, 842
    See application file for complete search history.

(56) References Cited

U.S. PATENT DOCUMENTS

| | | | |
|---|---|---|---|
| 4,867,498 A | 9/1989 | Delphia et al. |
| 5,355,228 A | 10/1994 | Mizuno et al. |
| 5,408,044 A | 4/1995 | Spiegel |
| 5,510,957 A | 4/1996 | Takagi |
| 5,610,376 A | 3/1997 | Takagi et al. |
| 6,362,976 B1 | 3/2002 | Winters et al. |
| 6,946,988 B2 | 9/2005 | Edwards et al. |
| 7,084,932 B1 | 8/2006 | Mathias et al. |
| 7,124,989 B1 | 10/2006 | Lee et al. |
| 7,490,887 B2 | 2/2009 | Vitito |
| 7,516,996 B2 | 4/2009 | Vitito |
| 2002/0085129 A1 | 7/2002 | Kitazawa |
| 2005/0179559 A1 | 8/2005 | Edwards et al. |

(Continued)

FOREIGN PATENT DOCUMENTS

| | | |
|---|---|---|
| JP | 4-27280 A | 1/1992 |
| JP | 8-149584 A | 6/1996 |

(Continued)

*Primary Examiner* — Jeanette E Chapman  
*Assistant Examiner* — James Buckle, Jr.  
(74) *Attorney, Agent, or Firm* — Kenealy Vaidya LLP; Mark E. Duell

(57) ABSTRACT

A vehicle entertainment system and method to prevent a mechanical connection between certain components of an entertainment system for a vehicle can include an entertainment system housing containing a plurality of entertainment components and a remote control module. The remote control module can include a user interface on a surface of the remote control module. In addition, the remote control module can be configured to prevent secure mounting of the remote control module to the entertainment system housing when the remote control module is not the appropriate remote control module for the particular vehicle entertainment system.

9 Claims, 4 Drawing Sheets

(56) References Cited

U.S. PATENT DOCUMENTS

| | | |
|---|---|---|
| 2006/0055833 A1 | 3/2006 | Lee et al. |
| 2006/0109388 A1 | 5/2006 | Sanders et al. |
| 2006/0231513 A1 | 10/2006 | Thorson et al. |
| 2007/0153139 A1 | 7/2007 | Turner et al. |
| 2007/0171316 A1 | 7/2007 | Mathias et al. |
| 2009/0015731 A1 | 1/2009 | Nagami |
| 2011/0019106 A1 | 1/2011 | Kimura et al. |
| 2011/0090411 A1 | 4/2011 | Finneman |

FOREIGN PATENT DOCUMENTS

| | | |
|---|---|---|
| JP | 9-149479 A | 6/1997 |
| JP | 10-126869 A | 5/1998 |
| JP | 2003-231443 A | 8/2003 |

REMOTE CONTROL DOCK SYSTEM AND METHOD

This application claims the priority benefit under 35 U.S.C. §120 and is a Divisional of U.S. patent application Ser. No. 13/448,210 filed on Apr. 16, 2012, now U.S. Pat. No. 8,471,965 which is a Divisional of U.S. patent application Ser. No. 12/346,831 filed on Dec. 30, 2008, now U.S. Pat. No. 8,159,623, and therefore also claims the priority benefit under 35 U.S.C. §119 of U.S. Provisional Patent Application No. 61/017,827 filed on Dec. 31, 2007, the subject matter of which applications are hereby incorporated in their entireties by reference.

BACKGROUND

1. Field

The presently disclosed subject matter relates to a vehicle system that utilizes a remote control device, the remote control, and related methods of use and manufacture.

2. Description of the Related Art

Existing vehicle entertainment systems provide passengers, especially in vehicles having multiple rows of rear seats such as minivans, sports-utility vehicles, and cross-over vehicles, with remote control of the radio, CD player, DVD player, and other available entertainment or other systems without accessing the main controls of the head unit which are typically located between the driver and the front seat passenger. Additionally, the vehicle entertainment system can include a rear entertainment system (RES) that has a viewing screen in proximity to and readily accessible by the rear seat passengers. The remote controls used with these devices are typically mounted to a console or housing in proximity to the rear seat passengers and are hard wired to the head unit for the vehicle entertainment system. Alternatively, the remote control can be wirelessly linked to the head unit.

One example of an ES is described in U.S. Pat. No. 7,190,798 to Yasuhara (Yasuhara). Referring to FIGS. 1, 2 and 7 of Yasuhara, an entertainment system of a vehicle includes a head unit, a rear controller, a display device, and a remote controller. The head unit is mounted on a dashboard in the front seat area of the vehicle so that a driver or front seat passenger can operate the head unit. The rear controller is mounted on a ceiling of the vehicle so that a rear user can operate it. The rear audio source can be controlled through the head unit and/or the rear controller. The rear controller can be accessed by a user from the remote controller. However, the entertainment system of Yasuhara does not provide for a secure mount for the remote controller when not in use by a passenger in the vehicle.

There is a known ES similar to that disclosed by Yasuhara that provides a docking station for the remote controller. The remote controller can be removed from or secured to the docking station. This known remote controller can be used by a passenger in the vehicle to control the ES when removed from the docking station or when mounted to the docking station.

Typically, vehicle manufacturers source vehicle entertainment systems from multiple suppliers to provide differences in luxury and refinement across a make and/or model range or to obtain or maintain a competitive advantage in the marketplace as innovations or additional features are made available by the suppliers. In order to maintain customer familiarity with the components of the RES, the manufacturer may request that the outward appearance of the components of the ES sourced from one supplier remain unchanged relative to that of the components sourced from another supplier.

This outward similarity can make it difficult for a service technician or a vehicle passenger to quickly distinguish a remote controller provided by one supplier from that provided by another supplier. However, the internal structure and operation of the components may be unique to each supplier. Thus, accidental inclusion by a service technician, vehicle user, or other, of a remote controller from one supplier into the ES provided by another supplier can result in operational incompatibility.

SUMMARY

According to one aspect of the disclosure a method to prevent a mechanical connection between certain components of an entertainment system for a vehicle includes providing a housing containing a plurality of entertainment components, providing a remote control module including a user interface on a surface of the remote control module, and preventing secure mounting of the remote control module to the housing.

According to another aspect of the disclosed subject matter, an entertainment system includes a housing and a recess in the housing defining a docking surface to removably receive a remote control module when the remote control module is mounted to the housing. A method for mounting a removable remote control module to an entertainment system of a vehicle includes providing the housing with a lock pin movably mounted and biased to protrude through the docking surface, and a locator rib extending from the docking surface at a location spaced a first distance (D1) from an end of the lock pin, and providing the remote control module with an outer surface, a lock pin detent formed in the outer surface, and a locator rib recess in the outer surface spaced from the lock pin detent at a second distance (D2). The remote control module can be oriented so that the locator rib recess faces the locator rib. The remote control module can be inserted into the recess while facing the locator rib recess toward the locator rib. While inserting the remote control module, alignment of the locator rib recess with the locator rib and alignment of the lock pin detent with the lock pin can be permitted through cooperative interaction of the outer surface with the docking surface, when the second distance (D2) equals the first distance (D1). While inserting the remote control module, alignment of the locator rib recess with the locator rib and alignment of the lock pin detent with the lock pin can be prevented through cooperative interaction of the outer surface with the docking surface when the second distance (D2) does not equal the first distance (D1). The lock pin can be biased into secure engagement with the lock pin detent and the remote control module can be securely mounted in the housing recess when alignment between the lock pin detent and the lock pin is permitted. Secure engagement of the lock pin detent with the lock pin can be disallowed when preventing alignment between the lock pin detent and the lock pin.

According to another aspect of the disclosed subject matter, an entertainment system for a vehicle can include housing and a removable remote control module. The housing can have docking surface recessed in the housing, a lock pin movably mounted in the housing, and a locator rib. The lock pin can extend above and over an area of the docking surface. The locator rib can extend from the docking surface and can be spaced from an end of the lock pin by 3.7 mm. The removable remote control module can have an outer surface configured and dimensioned to mate with the housing when the remote control module is mounted in the housing. The outer surface can include a locator rib recess that receives the locator rib and a lock pin detent that receives the lock pin when the remote control housing is mounted on the housing. The locator rib recess can be spaced from the lock pin detent by a distance of 2.1 mm.

According to yet another aspect of the disclosed subject matter, a removable remote control module for an entertainment system of a vehicle can include a housing, a locator rib recess, a lock pin detent, and a plurality of user interface buttons. The housing can include a first face and a second face extending to the first face. The locator rib recess and the lock pin detent can be formed in the first face, wherein the locator rib recess is spaced from the lock pin detent by a distance of 2.1 mm. The plurality of user interface buttons can be movably mounted in the housing along the second face of the housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
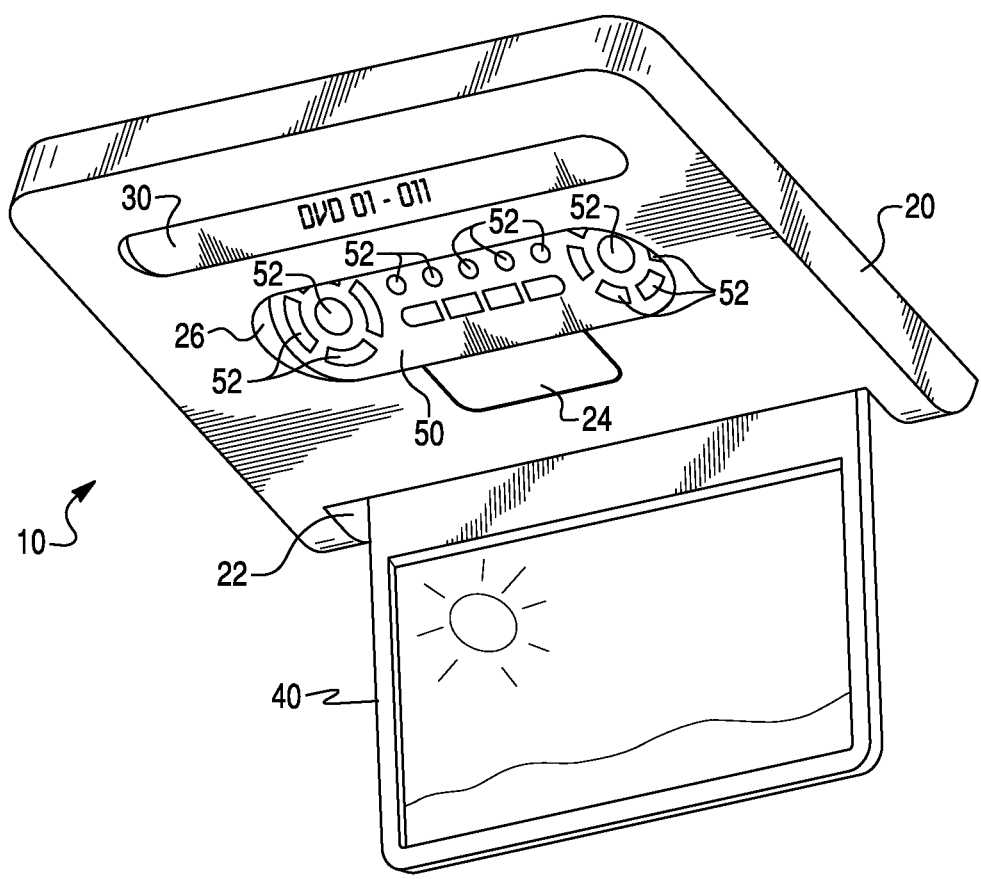
FIG. 1 is a perspective view of an entertainment system made in accordance with principles of the disclosed subject matter.

FIG. 1 illustrates an embodiment of an entertainment system (ES) 10 made in accordance with principles of the disclosed subject matter. The ES 10 can be hard wired or wirelessly linked to a head unit. The ES 10 includes a housing 20 that can contain a plurality of entertainment components such as, a function display 30, a display screen 40, and a remote control module 50. The function display 30 can be mounted in the housing 20 and can display information regarding the type of input device in use (for example, tape, CD, DVD, clock, etc.) and details relevant to the device in use (for example, side in play, track number, title, chapter, elapsed time, and/or date and time of day). The display screen 40 can be pivotally mounted to the housing 20 between a stowed position (not shown) where the display screen 40 is received in a screen recess 22 provided in the housing 20 and a viewing position (shown in FIG. 1).

The housing 20 can be mounted to the ceiling of the vehicle, a center console, a side wall of the vehicle, a seat back, etc. The housing 20 can include a movable release button 24 adjacent to a mounting area for the remote control module 50. In the exemplary embodiment depicted in FIGS. 1 and 2, the mounting area can be a docking recess 26 formed in the housing 20. The remote control module 50 can be securely and removably mounted in the docking recess 26 of the housing 20. The release button 24 can selectively release the remote control module 50 from its secure mounting in the docking recess 26, as will be described below in further detail.

The docking recess 26 can be configured and dimensioned to correspond with the surface contours and dimensions of the remote control module 50. That is, the docking recess 26 can have a length and a width that are approximately equal to the length and the width of the remote control module 50 and the surface contour of the docking recess 26 can be complimentary to the surface contour of the remote control module 50. In the exemplary embodiment illustrated in FIG. 2, the docking recess 26 can include a docking surface 28. The docking surface 28 can include a plurality of surface portions 28a, 28b, 28c.

With continuing reference to FIG. 1, the remote control module 50 can include a plurality of user interface buttons 52. Each of the buttons 52 provides a user with a unique control of the ES 10, such as input device selection, volume control, track selection, play, scan, stop, etc. The remote control module 50 may be hardwired to the ES 10 when mounted to the housing 20 or in wireless communication with the ES 10 when removed from the housing 20, as is known in the art, to communicate control signals to the head/rear unit generated by operation of the buttons 52.

Figure 2:
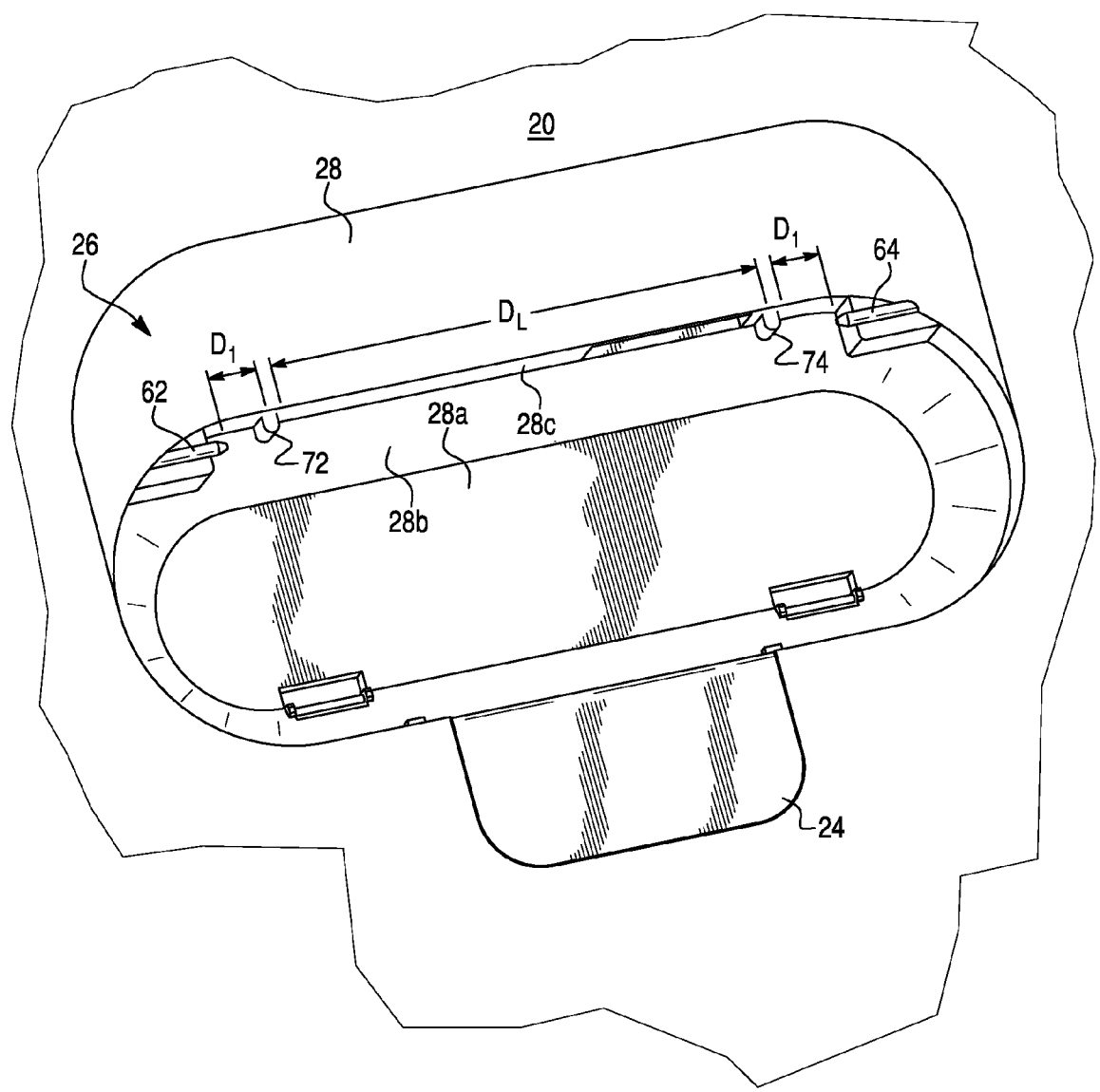
FIG. 2 is a perspective view of a portion of a housing of the entertainment system of FIG. 1.

In order to securely mount the remote control module 50 to the housing 20, the housing 20 can be provided with a lock member that cooperates with a lock engaging member provided on the remote control module 50. FIG. 2 illustrates an exemplary embodiment of the lock member configured as a first lock pin 62 that is biased to extend through a surface portion 28c into the docking recess 26. The first lock pin 62 can cooperate with a lock engaging member (see lock engaging members 108, 112 of the remote control module 100 of FIG. 3, for example) to securely mount the remote control module 100 to the docking recess 26. Actuation of the release button 24 applies a force against the bias of the first lock pin 62 so that the lock pin 62 disengages the lock members (e.g., 108, 112 of FIG. 3) on the remote control module 100, thus releasing the remote control module 100 from the housing 20. It should be noted that the remote control module 50 of FIG. 2 is a generic remote control module for purposes of description. Remote control modules 100 and 200 of FIGS. 3 and 4, respectively, are directed to first supplier and second supplier type control modules that have different locking structures with respect to each other. The remote control modules 100 and 200 can have the same general shape of remote control module 50.

As illustrated by way of example in FIG. 2, a second lock pin 64 can be provided that is biased to extend through a surface portion 28c into the docking recess 26. The second lock pin 64 can cooperate with a second lock engaging member (see lock engaging members 110, 114 of the remote control module 100 of FIG. 3, for example) to cooperate with the first lock pin 62 and associated lock engaging member (e.g., 108, 112 of FIG. 3) to securely mount the remote control module 100 to the docking recess 26. Likewise, actuation of the release button 24 can disengage the second lock pin 64 from its associated lock engaging member (e.g., 110, 114 of FIG. 3) on the remote control module 100.

Although two lock pins are shown and described, any number of lock pins can be used. Further, the lock pin(s) can be positioned to extend through any surface of the docking recess 26 as long as the lock pin(s) extends into the docking recess 26. Of course, the lock pin(s) could be formed as indent(s) while the indent(s) on the remote control modules are formed as pin(s).

As noted above, it is not uncommon for a vehicle manufacturer to dual source the entertainment system components with at least the outward appearance of the dual sourced components virtually identical but the inner workings incompatible with differently sourced parts or components. For example, a passenger or service technician may not be able to distinguish one remote control module from another merely by visual inspection. As such, accidental/inadvertent substitution of one of the dual source remote control modules for the other can impair or prevent desired operation of the entertainment system.

Figure 3:
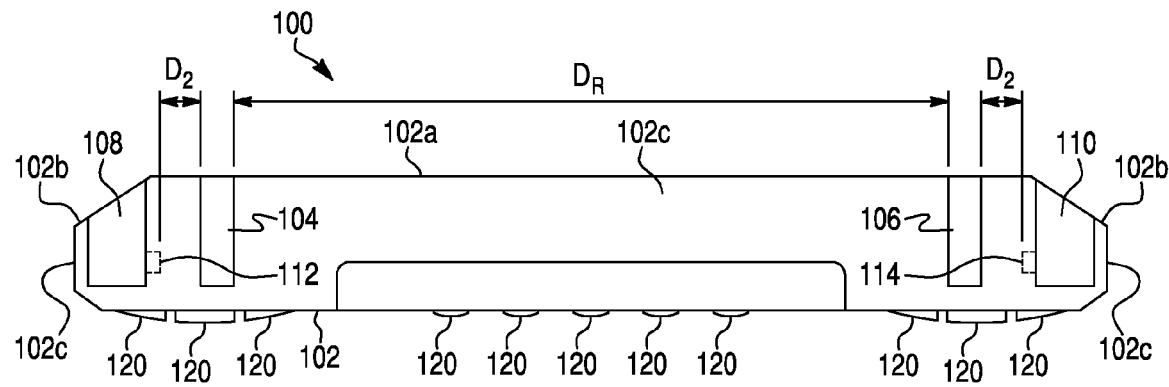
FIG. 3 is a side view of a remote control module provided by a first supplier in accordance with the disclosed subject matter.
Figure 4:
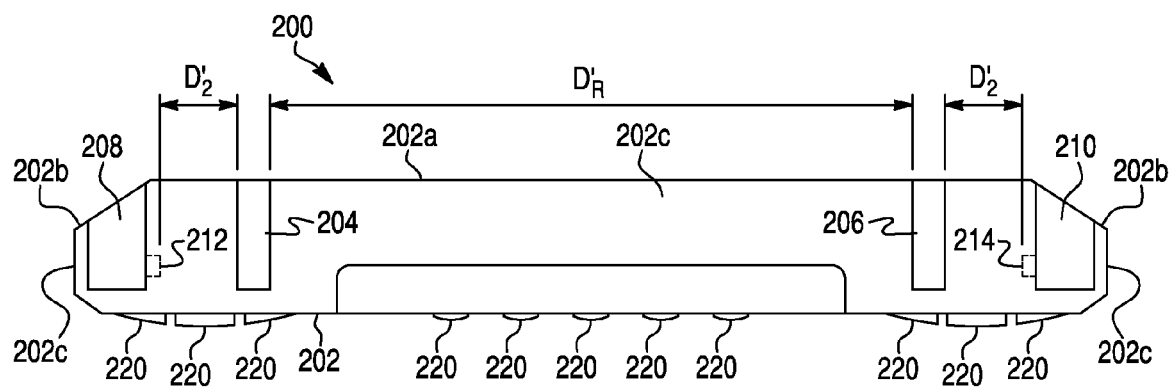
FIG. 4 is a side view of a remote control module provided by a second supplier in accordance with the disclosed subject matter.

FIGS. 3 and 4 illustrate exemplary embodiments of first and second remote control modules 100, 200 that are sourced from two different suppliers. Outwardly, the remote control modules 100, 200 appear identical to the remote control module 50 depicted in FIG. 1 so that a consumer or vehicle service technician, etc., would not necessarily discern any difference in the two modules 100, 200. Specifically, the outer surface contours, the dimensions, and the number and configuration of the user interface buttons 120, 220 can be identical to the outer surface contours, the dimensions, and the number and configuration of the user interface buttons 52 of the remote control module 50.

Returning to FIGS. 1 and 2, the docking recess 26 can include a docking surface 28. The docking surface 28 can include a plurality of surface portions 28a, 28b, 28c configured and dimensioned to engage and mate with a plurality of surface portions 102a, 102b, 102c (FIG. 3), respectively, of the outer surface 102 of the first remote control module 100 when the first remote control module 100 (FIG. 3) is mounted to the housing 20 and configured and dimensioned to mate with a plurality of surface portions 202a, 202b, 202c (FIG. 4), respectively, of the outer surface 202 (FIG. 4) of the second remote control module 200 (FIG. 4). Thus, both modules 100, 200 (FIGS. 3 and 4) can appear to a user or a service technician as being appropriate for use with the ES 10.

However, the internal workings of the second remote control module 200 (FIG. 4), which can be provided by a supplier different from that supplying the ES 10 and the first control module 100 (FIG. 3), may not be electronically compatible with the remaining components of the ES 10 or other components of the vehicle. In order to alert a vehicle passenger or service technician to this potential incompatibility, the housing 20 can be configured to mechanically mount the first remote control module 100 of FIG. 3 and to prevent mechanical mounting of the second remote control module 200 of FIG. 4. Thus, a user will be able to determine whether the remote module is suitable for use with the vehicle ES simply by attempting to mount the remote module in the housing. Details of this interaction will be discussed below.

Referring to FIG. 2, the housing 20 can include first and second locator ribs 72, 74 extending from the docking surface 28 of the housing 20 along the surface portion 28c. The first and second locator ribs 72, 74 can be spaced from each other at a distance DL. In one embodiment, the distance DL is approximately 132 mm. The first locator rib 72 is spaced from an end of the first lock pin 62 by a first distance D1. The second locator rib 74 is spaced from an end of the second lock pin 64 also by the first distance D1. In one embodiment, the first distance D1 is approximately 3.7 mm.

As will be discussed below, the locator ribs 72, 74 engage and cooperate with the first remote control module 100 to position the first remote control module 100 in the docking recess 26 so that the remote control module 100 can be secured to the housing 20 via the lock pins 62, 64 extending from the surface of the housing 20. The locator ribs 72, 74 in the housing 20 can also cooperate with the outer surface 202 of the second remote control module 200 to prevent engagement of the lock pins 62, 64 of the housing with the second remote control module 200. In this case, the locator ribs 72, 74 are configured to act as interference members, as will be described in more detail below.

Although two locator ribs are shown and described, any number of locator ribs can be used. Additionally, the locator rib(s) can extend along any surface of the docking surface as long as the locator rib(s) extend into the docking recess. Also, the number of locator ribs can be equal to or different from the number of lock pins.

Cooperation between the locator ribs 72, 74 and the first remote control module 100 will now be discussed. As illustrated in FIG. 3, the first remote control module 100 can include first and second locator rib recesses 104, 106 formed in two of the surface portions 102a, 102c of the outer surface 102 of the remote control module 100. The first locator rib recess 104 is spaced from the second locator rib recess 106 by a distance DR. The distance DR is approximately equal to the distance DL between the locator ribs 72, 74 of the housing 20. In one embodiment, the distance DR is approximately equal to 120.5 mm.

As a result of spacing the locator rib recesses 104, 106 substantially equidistant to the spacing between the locator ribs 72, 74, the locator rib recesses 104, 106 of the first remote control module 100 can engage and cooperate with the locator ribs 72, 74 of the housing 20 to guide the first remote control module 100 into proper alignment relative to the docking recess 26 so that the first remote control module 100 can be securely mounted to the housing 20. The number of locator rib recesses should equal or exceed the number of locator ribs provided on the housing 20.

With further reference to FIG. 3, the interaction of the lock pins 62, 64 (FIG. 2) with the first remote control module 100 will now be described. The first remote control module 100 can include a lock engaging member in the form of a first lock pin recess 108 and a first lock pin detent 112 (shown in phantom) provided in the first lock pin recess 108. In the exemplary embodiment of FIG. 3, the first remote control module 100 can also include a second lock pin recess 110 and a second lock pin detent 114 provided in the second lock pin recess 110.

The first lock pin detent 112 is spaced from the first locator rib recess 104 by a second distance D2. The second lock pin detent 114 is spaced from the second locator rib recess 106 also by the second distance D2. The second distance D2 is approximately equal to the first distance D1 (FIG. 2). In one embodiment, the second distance D2 is approximately 2.1 mm.

During insertion of the first remote control module 100 into the docking recess 26 and positioning by the cooperative interaction between the locator ribs 72, 74 and the locator rib recesses 104, 106, the first lock pin 62 can slide along the first lock pin recess 108 until the first lock pin detent 112 aligns with the first lock pin 62. When the first lock pin detent 112 aligns with the first lock pin 62, the biasing force acting on the first lock pin 62 can displace the first lock pin 62 into secure engagement in the first lock pin detent 112. Thus, the first remote control module 100 can be securely mounted to the housing 20.

Similarly, the second lock pin 64 can slide along the second lock pin recess 110 until the second lock pin detent 114 aligns with the second lock pin 64. When the second lock pin detent 114 aligns with the second lock pin 64, the biasing force acting on the second lock pin 64 can displace the second lock pin 64 into secure engagement in the second lock pin detent 114. Thus, the first remote control module 100 can be further securely mounted to the housing 20.

Actuation of the release button 24 displaces the lock pins 62, 64 out of secure engagement with the lock pin detents 112, 114, thereby releasing the first remote control module 100 from the housing 20.

The second remote control module 200 of the exemplary embodiment illustrated in FIG. 4 is provided by a supplier different from that which supplies the ES 10 and first remote control module 100. As such, the second remote control 200 can be electronically incompatible with the ES 10. In order to alert a user or a vehicle technician, etc., of this potential incompatibly, the locator ribs 72, 74 of the housing 20 can act as interference members. The locator ribs 72, 74 are positioned to create an interference fit between the second control module 200 and the docking recess 26 so that the second control module 200 cannot be securely mounted to the housing 20.

Specifically, and with reference to FIGS. 2 and 4, the second remote control module 200 can include first and second locator rib recesses 204, 206 that extend along surface portions 202a, 202c. Additionally, the second control module 200 can include first and second lock pin recesses 208, 210 and first and second lock pin detents 212, 214.

These locator rib recesses 204, 206 are spaced apart by a distance D'R that is unequal to the distance DL between the locator ribs 72, 74 of the housing 20. In this exemplary embodiment, the distance D'R is less than the distance DL. Similarly, the distance D'2 between the locator rib recesses 204, 206 and the respective lock detents 212, 214 can be unequal to the distance D1 between the locator ribs 72, 74 and the lock pins 62, 64 of the housing.

Alternatively the distance D'R can be greater than the distance DR and the distance D'2 can be less than the distance D2.

As such, the locator ribs 72, 74 cannot be aligned with the locator rib recesses 204, 206 of the second remote control module 200 when the outer surface 202 of the second remote control 200 engages a portion (e.g., surface portion 28c) of the docking surface 28.

Figure 5:
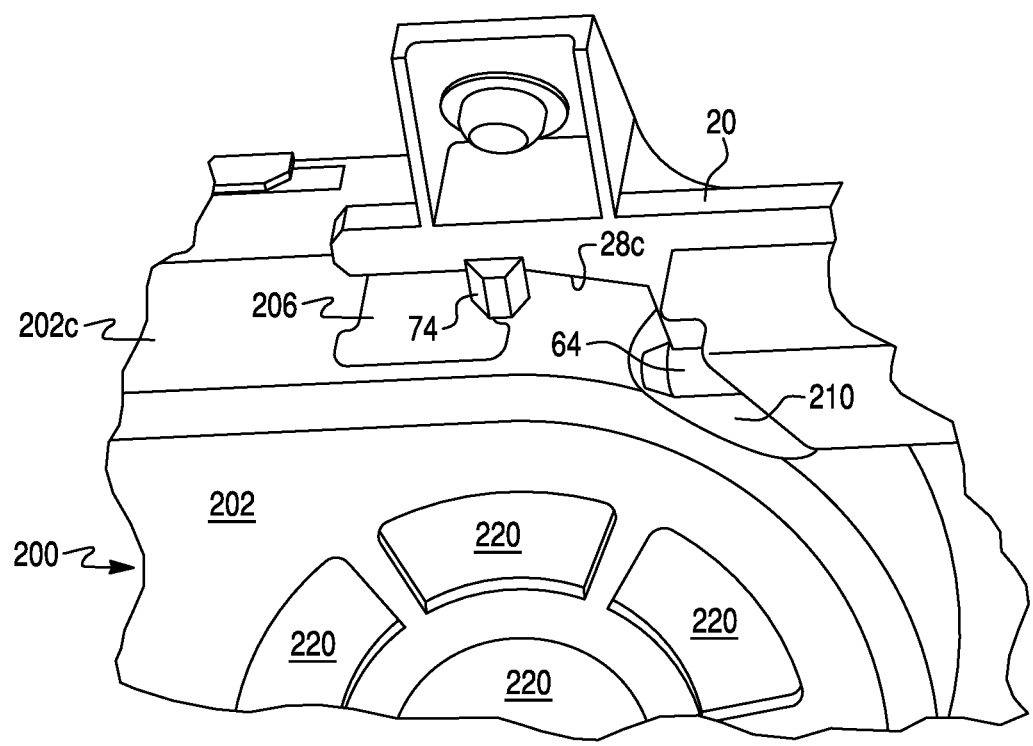
FIG. 5 is a perspective view of a portion of the remote control module of FIG. 4 inserted into the housing of FIG. 2.

FIG. 5 illustrates an interference fit between a housing 20 provided by a first supplier and a remote control module 200 of FIG. 4 provided by a second supplier. Portions of the housing 20 and the second remote control module 200 have been omitted for clarity. Due to misalignment between the second locator rib 74 and the second locator rib recess 206, the second locator rib 74 contacts the surface portion 202c of the outer surface 200 at a position intermediate the second locator rib recess 206 and the lock second pin recess 210 when the remote control module 200 is attempted to be fitted into the housing 20. The locator rib 74 contacts a portion the second remote control module 200 to disallow full entry (or locking) of the remote control module 200 in housing 20. Thus, an interference fit is created between the second remote control module 200 and the docking recess 26 and insertion of the second remote control module 200 is partially blocked by the second locator rib 74. This interference fit maintains the lock pin detent 214 (not shown—see FIG. 4) at a position spaced from the lock pin 64, thereby preventing alignment and engagement of the second lock pin detent 214 with the second lock pin 64.

Thus, a housing 20 provided by a first supplier can accept a first module 100 provided by the first supplier for secure mounting thereto and prevent secure mounting of a second module 200 provided by a second supplier. Likewise, a housing 20 provided by a second supplier can accept a second module 200 provided by the second supplier for secure mounting thereto and prevent secure mounting of a first module 100 provided by the first supplier.

While certain embodiments of the invention are described above, it should be understood that the invention can be embodied and configured in many different ways without departing from the spirit and scope of the invention. For example, the docking recess can be omitted from the housing and the locator rib(s) and lock pin(s) can be provided on a planar mounting area on the exterior surface of the housing. Additionally, the locator rib(s) can be provided on the remote control module and the locator rib recess(es) can be provided on the housing. Similarly, the positions of the lock pin detent(s) and the lock pin(s) can be reversed. Still further, the number of locator ribs provided on the housing provided by the first supplier can be different from the number of locator rib recesses provided on the remote control module provided by the second supplier. Other locking devices can be used such as a snap fit, hook and loop fasteners, and a striker/latch assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated in their entirety by reference.

What is claimed is:

1. A method to prevent a mechanical connection between certain components of an entertainment system for a vehicle comprising:
   providing a housing containing a plurality of entertainment components and including a first locator structure;
   providing a remote control module including a user interface on a surface of the remote control module and a second locator structure that is incompatible with the first locator structure; and
   preventing secure mounting of the remote control module to the housing due to incompatibility between the first locator structure and the second locator structure such that mechanical connection of the remote control module to the housing is prevented.

2. The method according to claim 1, wherein preventing secure mounting comprises:
   providing the housing with a lock member;
   providing the remote control module with a lock engaging member;
   placing the lock engaging member proximate the lock member; and
   preventing contact of the lock engaging member with the lock member when the lock engaging member is placed proximate the lock member.

3. A method to prevent a mechanical connection between certain components of an entertainment system for a vehicle comprising:
   providing a housing containing a plurality of entertainment components;
   providing a remote control module including a user interface on a surface of the remote control module; and
   preventing secure mounting of the remote control module to the housing, wherein preventing secure mounting includes:
      providing the housing with a lock member;
      providing the remote control module with a lock engaging member;
      placing the lock engaging member proximate the lock member; and preventing contact of the lock engaging member with the lock member when the lock engaging member is placed proximate the lock member, wherein preventing contact includes:
providing an interference member extending from the housing;
engaging the interference member with a portion of the remote control module spaced from the lock engaging member before the lock engaging member contacts the lock member; and
maintaining the lock engaging member at a distance spaced from the lock member while the portion of the remote control module engages the interference member.

4. A method to prevent a mechanical connection between certain components of an entertainment system for a vehicle comprising:
providing a housing containing a plurality of entertainment components;
providing a remote control module including a user interface on a surface of the remote control module; and
preventing secure mounting of the remote control module to the housing, wherein preventing secure mounting includes:
providing the housing with a lock member;
providing the remote control module with a lock engaging member;
placing the lock engaging member proximate the lock member; and
preventing contact of the lock engaging member with the lock member when the lock engaging member is placed proximate the lock member, wherein preventing contact includes:
providing the remote control module with a module width and a module length;
providing the housing with a docking surface that defines a docking recess in the housing, wherein the docking recess has a length and a width substantially equal to the module length and the module width, respectively; and
providing an interference member extending from the housing and into the docking recess;
engaging the interference member with a first portion of the remote control module spaced from the lock engaging member before the lock engaging member contacts the lock member;
engaging a portion of the docking surface spaced from the interference member with a second portion of the remote control module that is spaced from the first portion by a distance that is less than one of the width and the length of the remote control module before the lock engaging member contacts the lock member; and
maintaining the lock engaging member at a distance spaced from the lock member when the remote control module engages the interference member and the portion of the docking surface.

5. The method according to claim 4, wherein maintaining the lock engaging member comprises creating an interference fit between the portion of the docking surface, the interference member and the remote control module.

6. The method according to claim 5, wherein engaging a portion of the docking surface comprises engaging a portion of the docking surface opposing the interference member; and
wherein creating the interference fit comprises spacing the interference member from the portion of the docking recess opposite the interference member at a distance measured parallel to one of the width and the length of the docking recess that is less than the one of the length and the width of the docking recess.

7. The method according to claim 6, further comprising:
providing the lock member with a pin biased to extend into the docking recess; and
providing a lock recess in a surface of the remote control module and a lock detent in a surface of the lock recess; and
wherein maintaining the lock engaging member at a distance includes maintaining the lock detent spaced at a distance from the lock pin.

8. The method according to claim 7, further comprising providing the remote control module with a recess at a position such that the portion of the remote control module that engages the interference member is intermediate the recess and the lock engaging member.

9. The method according to claim 7, further comprising providing the remote control module with a recess at a position intermediate the portion of the remote control module that engages the interference member and the lock engaging member.

* * * * *